United States Patent
Furukawa et al.

(10) Patent No.: US 6,252,832 B1
(45) Date of Patent: Jun. 26, 2001

(54) INITIALIZING POSITION FOR TRANSPORTING A REPRODUCING APPARATUS

(75) Inventors: Kiyoshi Furukawa; Hiroyuki Kobayashi; Hidetsugu Kubota; Takuya Abe; Masakazu Takahashi; Hideaki Watarihana; Hiroki Goto; Yoshimichi Nishio; Yasutaka Suzuki; Kazunori Matsuo; Teruo Takahashi, all of Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/433,739

(22) Filed: Nov. 1, 1999

(30) Foreign Application Priority Data

Nov. 9, 1998 (JP) .................................. 10-317544

(51) Int. Cl.[7] .................................................. G11B 17/22
(52) U.S. Cl. ............................................................ 369/33
(58) Field of Search ................................ 369/33, 34, 36, 369/37, 38, 39, 178, 32, 58

(56) References Cited

U.S. PATENT DOCUMENTS

| | | | |
|---|---|---|---|
| 4,697,256 | * | 9/1987 | Shinkai .................................. 369/32 |
| 5,394,383 | * | 2/1995 | Hira ....................................... 369/32 |
| 5,410,525 | * | 4/1995 | Yokota ................................... 369/32 |
| 5,495,458 | * | 2/1996 | Ikeda et al. ........................... 369/32 |
| 5,633,840 | * | 5/1997 | Han ........................................ 369/32 |
| 5,764,602 | * | 6/1998 | You et al. .............................. 369/32 |
| 5,808,982 | * | 9/1998 | Yun .................................... 369/44.28 |

* cited by examiner

Primary Examiner—Tan Dinh
(74) Attorney, Agent, or Firm—Arent Fox Kintner Plotkin & Kahn, PLLC

(57) ABSTRACT

A system for reproducing recording mediums has a reproducing device, a storing device for storing a plurality of recording mediums, a moving device for relatively moving the reproducing device and storing device for reproducing a recording medium. A controller is provided to be responsive to a command for operating the moving device for positioning the reproducing device and the storing device at predetermined fixable initializing positions.

8 Claims, 5 Drawing Sheets

INITIALIZING POSITION FOR TRANSPORTING A REPRODUCING APPARATUS

BACKGROUND OF THE INVENTION

The present invention relates to a reproducing system for reproducing recording mediums such as a CD and DVD (digital versatile disc), and more particularly to a reproducing system provided with a function for compulsorily setting movable members disposed therein to initial positions, rendering them immovable.

In a conventional reproducing system, when a main power source such as a commercial power source, automotive power source and portable battery is connected thereto, and is turned on, a reset circuit is operated. Accordingly, an electronic system is reset, so that the initialization process is carried out to confirm the state within the system. Namely, it is checked whether recording mediums are stored on trays, and the reproducing device such as an optical pickup and other movable members are moved to initial positions to await reproduction instruction. Only after the initialization, the device enters the normal operational mode capable or reproduction. Thus, the reproducing system is not immediately shifted to the normal operational mode wherein reproduction can be executed, but the predetermined initialization is automatically carried out to self-diagnose the state of the internal members, thereby setting the movable members to so-called home positions, and thereafter shifted to the normal operational mode.

When shipping the product after a check, in order to prevent the movable members from receiving a shock and being injured, a fixing bracket is mounted so as to fix the members to the housing of the reproducing system. Namely, the movable members are fixed at the initial positions where the members are most mechanically stable.

In the conventional system, after the system is checked, the fixing bracket is set. However, it takes time to move the movable members to the initial positions. Hence it is difficult to increase the efficiency of the operation, as described hereinafter in detail.

For example, when the initializing process is operated, each of trays for storing a disc is carried to the reproducing position, and the reproducing system is operated in the same manner as if to actually reproduce a disc to confirm the existence of the disc. Thus the operator has to wait for the initialization process to end before mounting the fixing bracket.

More particularly, in a reproducing system having an autochanger, trays or racks for storing a plurality of discs are provided. A desired tray or rack must be positioned to coincide with the reproducing device by an elevating mechanism so that a desired disc stored in the tray or the rack can be reproduced. When the initializing process is carried out in such a system, each of the trays or racks must be diagnosed so that even longer time is necessary.

Moreover, when the user has a device to be repaired, the same operation for mounting the fixing bracket to fix the movable members to the housing is carried out by a repairman to prevent the injury thereto. Hence, troublesome operation is needed to the return the device to the user after the repair.

SUMMARY OF THE INVENTION

An object of the present invention is to provide a reproducing system where the transportation of the system can be quickly performed without waiting the finish of resetting of the system.

According to the present invention, there is provided a system for reproducing recording mediums, having a reproducing device, a storing device for storing a plurality of recording mediums, moving means for relatively moving the reproducing device and storing device for reproducing a recording medium, the system comprising, instruction means for instructing a command, and control means responsive to the command for operating the moving means for positioning at least one of the reproducing device and the storing device at a predetermined fixable initializing position.

The present invention further provides a system for reproducing recording mediums, having a reproducing device, storing device for storing a plurality of recording mediums, moving means for relatively moving the reproducing device and storing device for reproducing a recording medium, the system comprising, a first mode for sequentially detecting discs stored in the storing device, a second mode for positioning the moving means at a predetermined initializing position, instruction means for instructing a command, and control means responsive to the command during the second mode for stopping the operation of the second mode and for operating the first mode.

The first mode is a mode for performing an initialization process after resetting by power on.

These and other objects and features of the present invention will become more apparent from the following detailed description with reference to the accompanying drawings.

DETAILED DESCRIPTION OF THE PREFERRED EMBODIMENT

Figure 1:
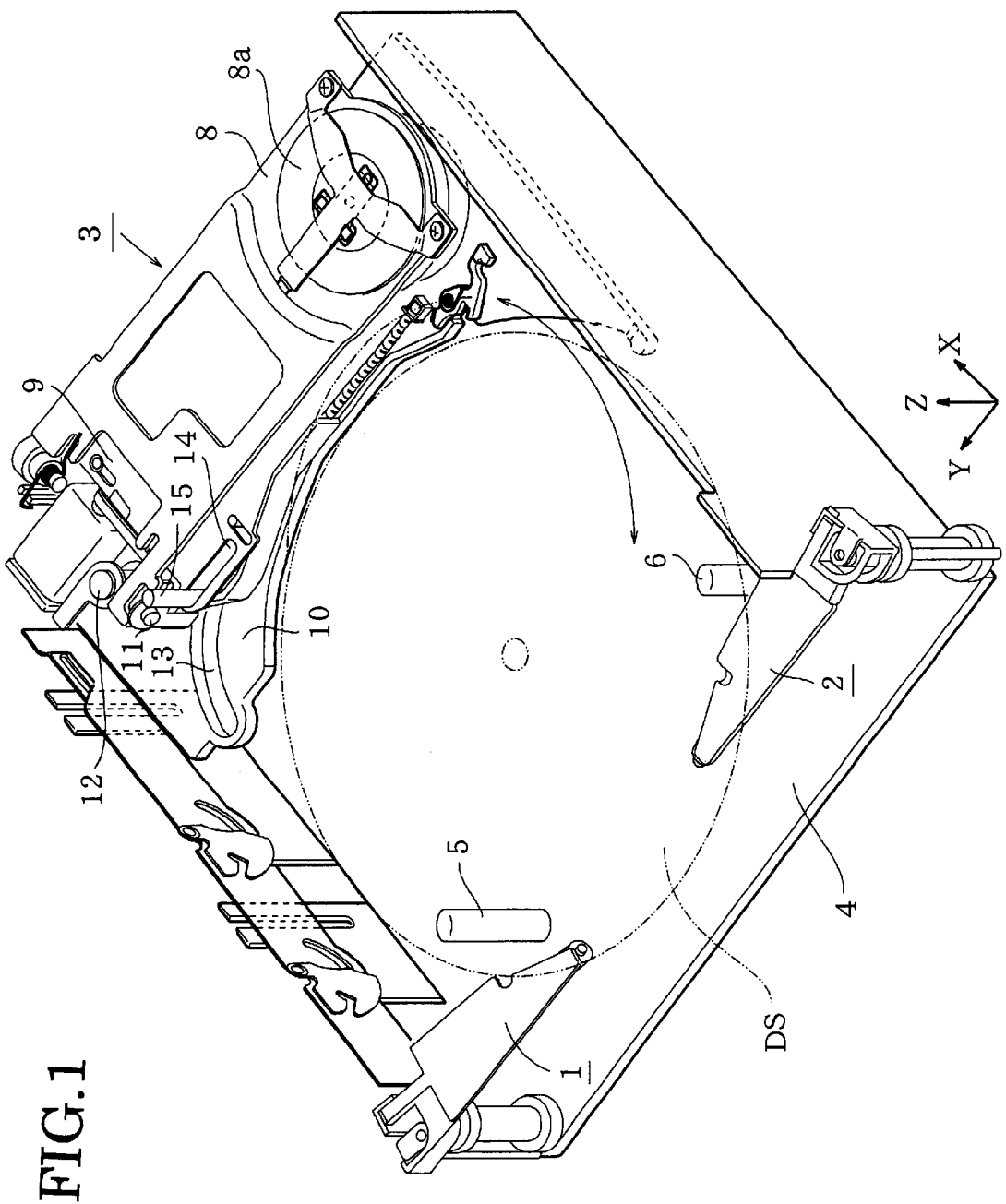
FIG. 1 is a perspective view showing a fixed chassis.

Referring to FIG. 1, the system of the present invention has a pair of disc carrying mechanisms 1 and 2, a reproducing device 3, a pair of shafts 5 and 6 mounted on a fixed chassis 4.

The reproducing device 3 has a clamp mechanism 8, a pickup mechanism 9 mounted on a movable chassis 10.

The pickup mechanism 9 is horizontally rotatably mounted on the movable chassis 10 by a shaft 12 and vertically rotatably mounted on a shaft 11 on the chassis.

A drive pin 15 is engaged with a guide hole 13 of the movable chassis 10 and with an elongated hole 14 of the pickup mechanism 9. By moving the drive pin 15, the pickup mechanism and the clamp mechanism 8 are rotated about the shaft 12.

The clamp mechanism 8 has a circular hub 8a, for clamping a disc DS on a turntable (not shown).

Figure 2:
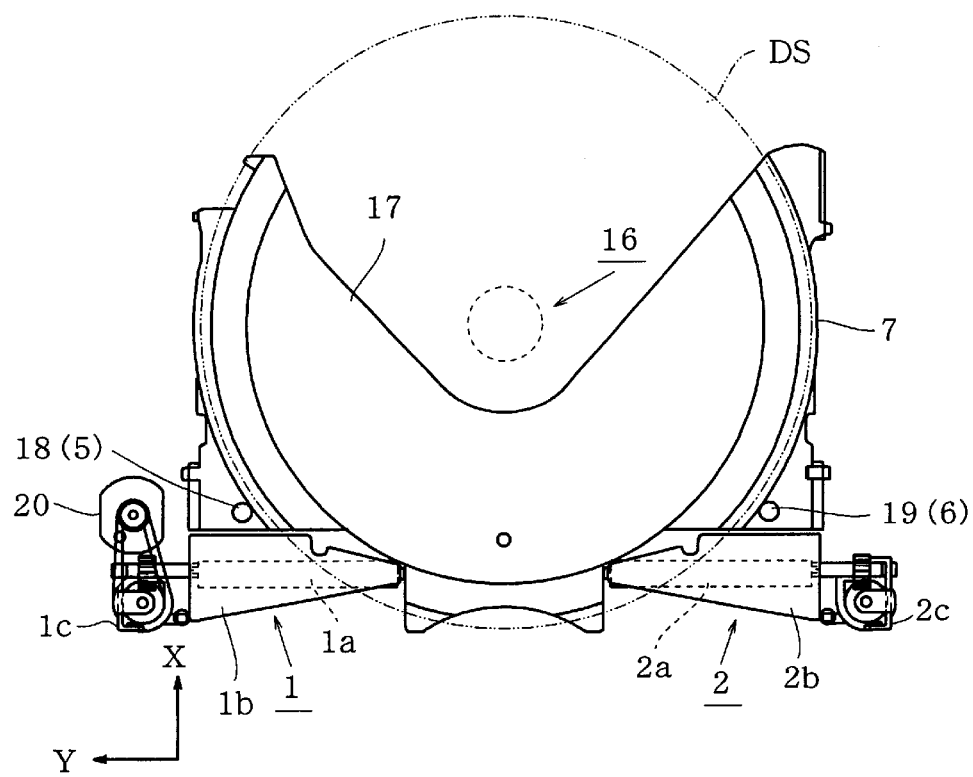
FIG. 2 is a plan view of a tray.

FIG. 2 is a plan view of a tray. As shown in FIG. 2, a tray 7 has a disc supporting plate 17 having a V-shaped notch 16. On the both sides of the plate 17, there is provided a pair of holes 18, 19 in which shafts 5. 6 (FIG. 1) are to be engaged.

In the V-shaped notch 16, the pickup mechanism 9 and clamping mechanism 8 are to be positioned at the reproduction of the disc DS.

In the present embodiment, six trays 7 are stacked and supported by the shafts 5, 6.

An elevating mechanism (not shown) is provided to be engaged with side plates of a lowermost tray so as to elevate the stack of the trays along the shafts 5, 6.

The disc carrying mechanisms 1, 2 are positioned toward the tray in the operating state, and retracted in the non-operating state when the trays are vertically moved.

The disc carrying mechanism 1 comprises a roller 1a and an engaging plate 1b. The roller 1a is connected to a rotating shaft of a motor 20 by a transmitting mechanism 1c composed by a gear mechanism and a belt mechanism so as to be rotated.

The disc carrying mechanism 2 has the same construction as the mechanism 1. Thus, when an operation switch is operated, the roller 1a is rotated, thereby carrying the disc DS inserted in the front opening to the turntable and discharging the disc.

Figure 3:
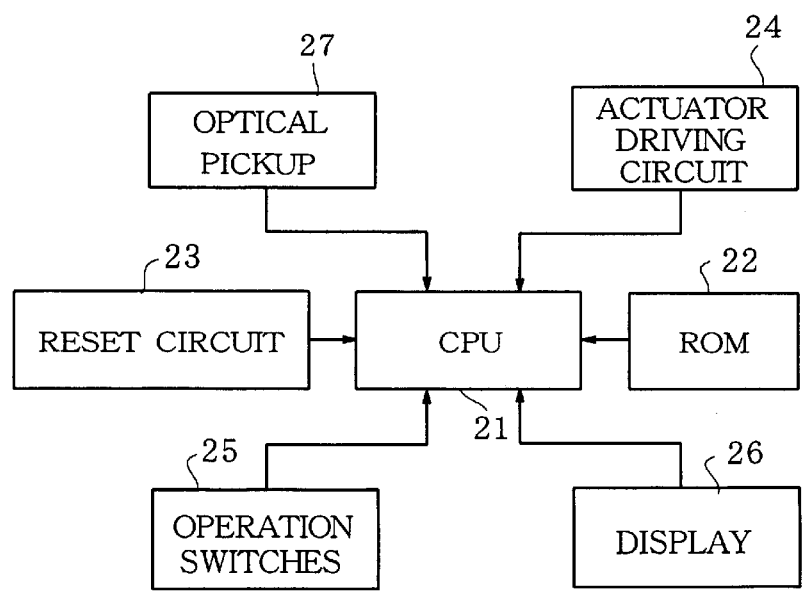
FIG. 3 is a block diagram of a control circuit provided in a reproducing system of the present invention.

Referring to FIG. 3, the control circuit of the reproducing system is mounted on the underside of the chassis 4 and comprises a central processing unit (CPU) 21 having a microprocessor unit (MPU) and a digital signal processing unit (DSP) for processing signals, read-only memory (ROM) 22 for storing a system program for controlling the reproducing operation of the system, power-on resetting circuit 23 for resetting the device when the power is turned on, and an actuator circuit 24 for driving movable parts including the optical pickup mechanism 9, clamp mechanism 8, and the above-described elevator mechanism.

The control circuit further has a plurality of operation switches 25, liquid crystal display 26 and an optical pickup 27, which are connected to the CPU 21. The operation switches 25 include designating switches for designating by a number, one of the trays 7 arranged in six tiers when reproducing or inserting a disc, switches for temporarily stopping the reproduction or designating a predetermined producing position of a disc at reproduction, and an ON/OFF switch for turning the power on and off. The CPU 21 controls the operation of the reproducing system by carrying out the program stored in the ROM 22.

The operation of the reproducing system is described hereinafter with reference to FIGS. 4 to 6.

Figure 4:
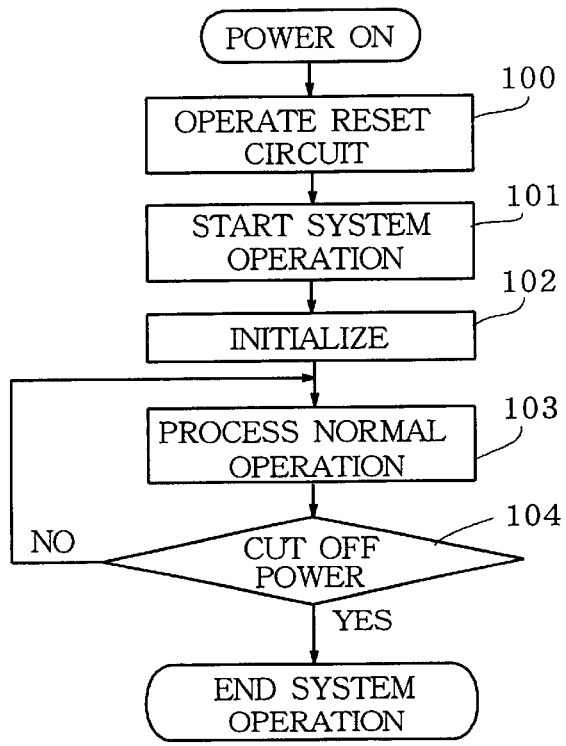
FIG. 4 is a flowchart describing a basic operation of the reproducing system.

Referring to FIG. 4, showing the basic operation of the reproducing system, when a main power source such as the commercial power source, automotive power source, and portable battery is turned on, the reset circuit 23 is operated, thereby to reset the CPU 21 at a step 100. Thereafter, the CPU 21 makes an access to the ROM 22, thereby starting a system operation at a step 101. At a step 102, an initializing process for self-diagnosing the state of the internal members is executed. When the initializing process is completed, normal operation process is started at a step 103 so that operations such as the reproduction of the disc is carried out. The normal operation is continued until the main power source is cut off at a step 104.

Here, when the above-described ON/OFF switch is turned on, the power-on resetting circuit 23 is not operated as a power-on resetting circuit.

More particularly, the power-on resetting circuit 23 is operated when the main power source is turned on and before the ON/OFF switch is operated. When the power-on resetting operation is started, the operations of steps 101 and 102 of FIG. 4 are performed to carry out the initialization process.

When the process of steps 100 to 102 is completed, the power supply and the stop of the supply are performed in accordance with the operation of the ON/OFF switch at the step 103.

Figure 5:
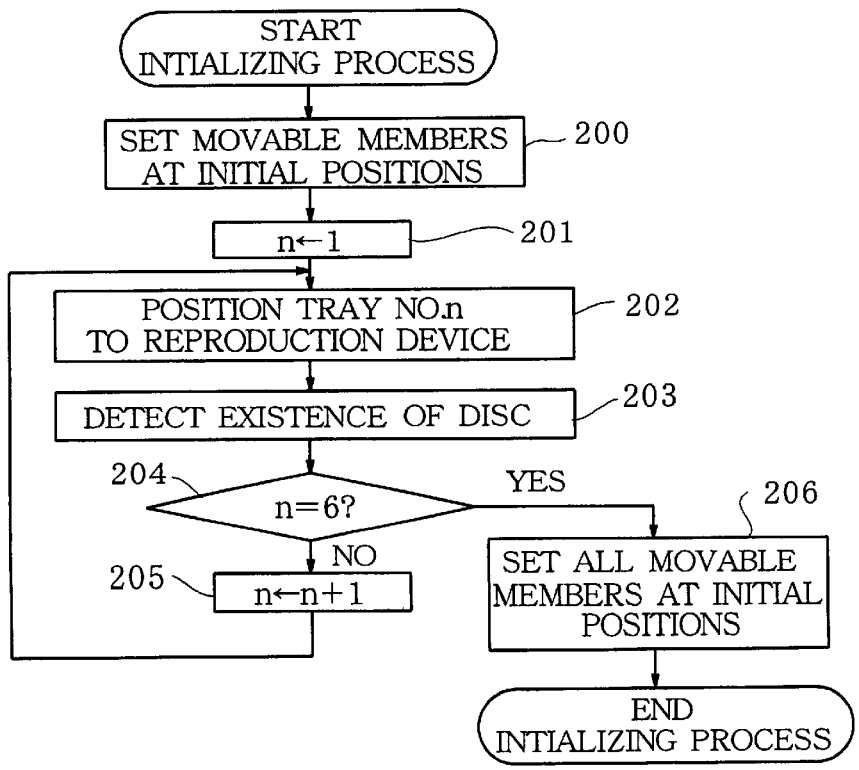
FIG. 5 is a flowchart describing an initializing process of the reproducing system.

The initializing process of the step 102 is described more in detail with reference to the flowchart of FIG. 5. At a step 200, the actuator driving circuit 24 is operated, thereby moving the reproducing device 3 to the initial position shown in FIG. 1. Furthermore, the trays 7 are integrated into a six-tiered block and moved to the initial position adjacent the bottom of the fixed chassis 4, and the other movable members are likewise moved to the predetermined respective initial positions.

The number of the first tray 7 at the lowest position, that is the tray No. 1, is stored at a predetermined register of the CPU 21 as n=1 at a step 201. At a step 202, the elevator mechanism is operated to move the tray No. 1 to the height of the reproducing device 3. The optical pickup mechanism 9 and the clamp mechanism 8 are swayed toward the recess 16 of the tray 7, and the optical pickup 27 is operated for reproduction.

Thus, the optical pickup 27 generates a read out signal which is analyzed by the CPU 21. Accordingly, at a step 203, whether there is a disc DS on the tray No.1 or not is detected. More particularly, if a predetermined recorded information which is recorded on the disc DS as a physical formal is detected in the read out signal, it is determined that the disc DS exists.

Thereafter, a flag data indicating that the disc exists on the tray No. 1 is stored in a disc management area comprising a flash memory provided in the CPU 21. On the other hand, if the disc does not exist, a flag data indicating that no disc exist is stored.

At a step 204, it is determined whether the tray which is checked is the uppermost tray No. 6. Since the tray is No. 1, the program goes to a step 205 where one is added to the count of the register. The steps 202 and 203 are repeated until the trays from No. 2 to No. 6 are checked.

When all of the trays are checked, the program proceeds from the step 204 to a step 206 wherein the reproducing device 3 is again moved to the initial position. The trays 7 integrated into one block and other movable members are also moved to the above-described initial positions. Namely, each of the movable members is moved to the waiting position where the member is mechanically most stable. Hence the initializing process is completed so that the program goes to the step 103 of FIG. 4.

During the initializing process of step 102 and the normal operation process in FIGS. 4 and 5, the CPU 21 is capable of always accepting an interrupt request for requesting the transportation mode in accordance with the operation of the switches. More particularly, when switches such as the designating switches of the operation switches 25 for designating trays, for example Nos. 1, 3, and 6 trays, are simultaneously operated in combination so as to indicate a code, it is determined that there is an interruption request for the transportation mode. As a result, the heretofore operation is compulsorily terminated to proceed to the process of the transportation mode shown in FIG. 6.

Figure 6:
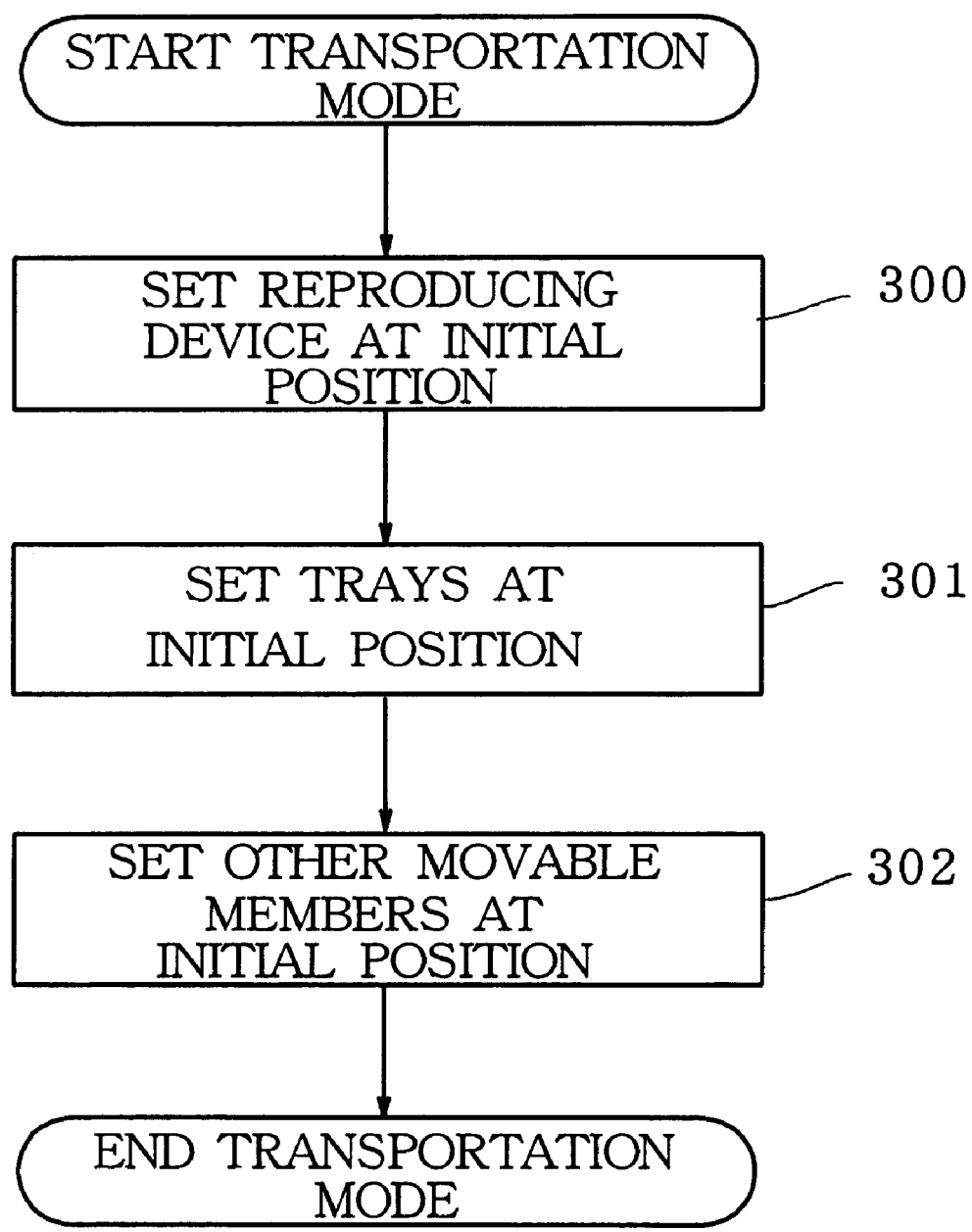
FIG. 6 is a flowchart describing a transportation mode of the reproducing system.

As shown in FIG. 6, when the transportation mode process is started, the reproducing device 3 is set to the initial position shown in FIG. 1 at a step 300. Thereafter, the trays 7 arranged in the integrated six-tiered block are moved to the initial position adjacent the bottom of the fixed chassis 4 at a step 301. The other movable members are likewise moved to initial positions at a step 302. Thereafter, the program goes to the normal operational process so as to await the operation of the operation switches 25 by the user.

When the user mounts a fixing bracket in the device without operating the switches 25, the reproducing device 3, trays 7 and other movable members are fixed in a housing, thereby enabling to transport the reproducing device.

Figure 7A:
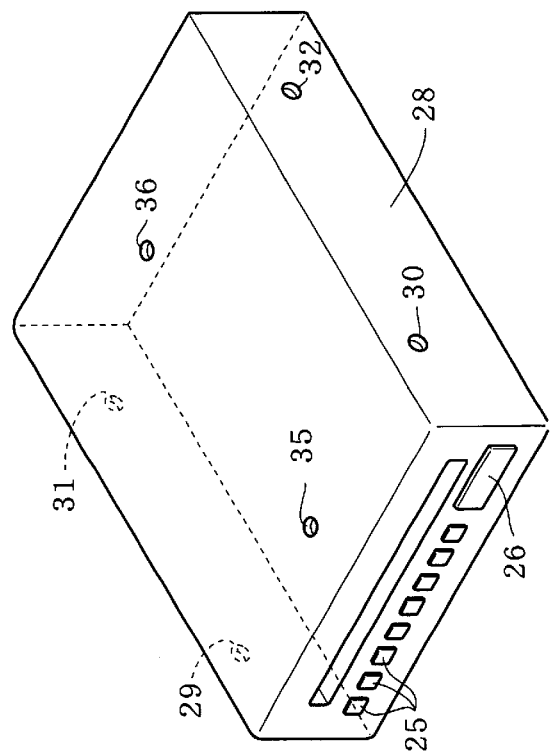
FIG. 7a is a perspective view of a housing of the reproducing system.

Referring to FIG. 7a, a housing 28 of the reproducing device for housing the trays 7 and the reproducing device 3 is provided with two pairs of opposite holes 29 and 30, and 31 and 32. The holes 29 and 30 are formed at substantially the same height as the uppermost tray, namely the tray No. 6, when the trays 7 are disposed at the initial position adjacent the bottom of the fixed chassis 4. The holes 31 and 32 are formed at substantially the same height as the upper surface of the clamp mechanism 8, which consists the reproducing device 3, when the reproducing device 3 is at the initial position.

Figure 7B:
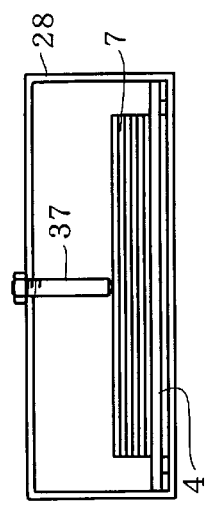
FIG. 7b is an illustration schematically showing the inner front portion of the housing of FIG. 7a when fixing shafts are inserted.
Figure 7C:
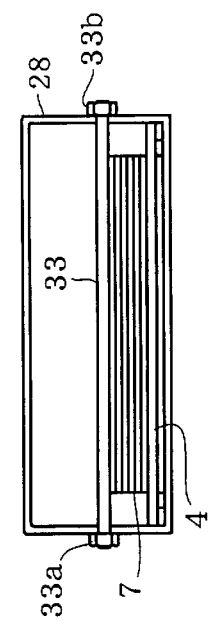
FIG. 7c is an illustration schematically showing the inner rear portion of the housing.

When the transportation mode process is executed and the trays 7 and the reproducing device 3 are set at the respective initial positions, a shaft 33 having screw threads is inserted through the holes 29 and 30 as shown in FIG. 7b as the fixing bracket. The shaft 33 is attached to the housing 28 by nuts 33a and 33b at both ends thereof. Another shaft 34 having screw threads is inserted in the holes 31 and 32 and attached to the housing by nuts 34a and 34b at both ends thereof as shown in FIG. 7c.

When the shafts 33 and 34 are thus mounted in the housing 28, the trays 7 are held and fixed between the shaft 33 and the fixed chassis 4. The optical pickup mechanism 9 and the clamp mechanism 8 are also held downward to the fixed chassis 4 by the shaft 34 so as to become immovable.

Figure 7D:
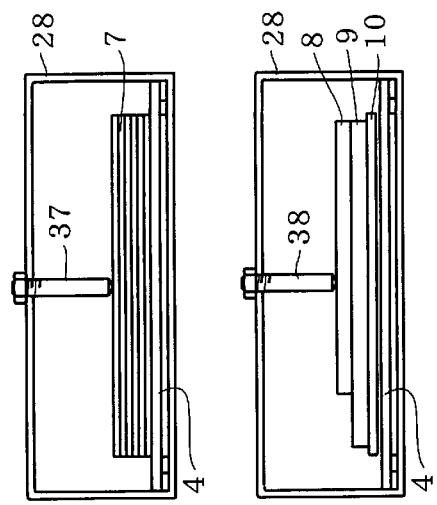
FIG. 7d is an illustration schematically showing the inner right side portion of the housing when other fixing shafts are inserted.
Figure 7E:
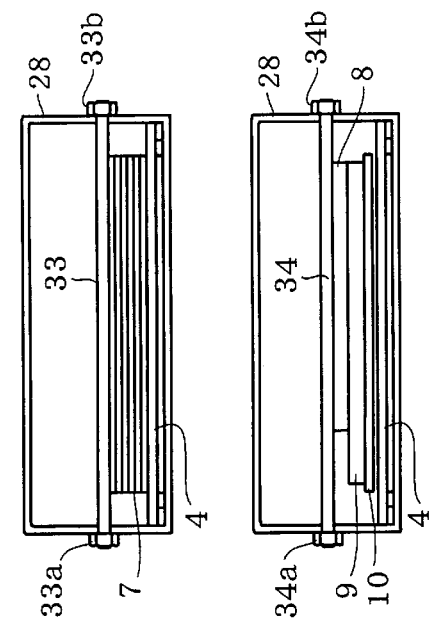
FIG. 7e is an illustration schematically showing the inner left side portion of the housing when the fixing shafts of FIG. 7d are inserted.

In another example, holes 35 and 36, each having an internal thread are formed on the upper plate of the housing 28. The hole 35 confronts the trays 7 and the hole 36 confronts the clamp mechanism 8. When the trays 7 and the reproducing device 3 are set at initial positions, shafts 37 and 38, each having a screw thread, are screwed in the holes 35 and 36 as shown in FIGS. 7d and 7e, respectively. Hence the end of the shaft 37 forces the trays 7 and the end of the shaft 38 forces the clamp mechanism 8 and the optical pickup mechanism 9 toward the fixed chassis 4, thereby rendering them immovable in the housing 28.

The shafts to be used may be arbitrarily selected from the shafts 33, 34, 37 and 38.

Thus in accordance with the present invention, the transportation mode can be requested even during the initializing process so that the movable members including the trays 7, clamp mechanism 8, and optical pickup mechanism 9 are compulsorily moved to the initial positions. Hence the fixing bracket can be quickly mounted.

Even during the normal operation where the disc is reproduced by the reproducing device 3, the movable members can be compulsorily moved to the initial positions, thereby enabling to mount the fixing bracket. As a result, when the product is shipped from the factory, or returned to the user after a repair, after the operational checking, the initializing process need not be set before mounting the fixing bracket. Thus the efficiency of the operational checking is improved.

In the above-described embodiment, the fixing bracket is mounted when the main power is not yet cut off. If the operation switches 25 are erroneously operated during the time, the movable member may be moved in response to the operation. However, the transportation mode can be requested after the movable members are moved, so that by hastily making the request, the movable members can be prevented from breaking. Nevertheless, it is preferable to cut off the main power before mounting the fixing bracket.

In addition, since the transportation mode is requested only when predetermined switches of the operation switches 25 are operated in combination to form a code, the user is prevented from erroneously making such a request.

The fixing bracket shown in FIGS. 7a to 7e are described only as examples, and any other structures may be adopted. In addition, an exclusive switch for setting the transportation mode may be provided.

When the transportation mode is requested, information indicating that the transportation mode process is started or ended may be shown on the display 26. Alternatively, a synthetic voice or an alarm may be sounded from a loudspeaker.

The present invention may be applied not only to the reproducing system provided with the autochanger storing a plurality of discs, but also to a reproducing system capable of storing only one disc.

In addition, the reproducing system to which the present invention is applied need not be limited to the above described reproducing system provided with an autochanger wherein a plurality of trays are vertically moved. For example, the present invention may be applied to a well-known conventional reproducing system provided with a plurality of detachable racks in each of which is stored a disc, and where the rack and the reproducing device are moved respective of each other, thereby enabling to reproduce the disc.

The present invention may further be applied to other reproducing systems for reproducing recording mediums other than the CD and DVD, such as a cartridge type medium and Minidisc (MD).

While the invention has been described in conjunction with preferred specific embodiment thereof, it will be understood that this description is intended to illustrate and not limit the scope of the invention, which is defined by the following claims.

What is claimed is:

1. A reproducing apparatus, comprising a reproducing device, a storing device for storing a plurality of recording mediums, and movers for relatively moving the reproducing device and the storing device, the reproducing apparatus comprising:

an instructor for instructing a command; and a controller responsive to the command for operating the movers for positioning at least one of the reproducing device and the storing device at a predetermined fixable initializing position for transport of the reproducing apparatus, wherein said fixable initializing position is a waiting position where the reproducing device and the storing device are mechanically most stable and are fixable in a housing.

2. A reproducing apparatus, comprising a reproducing device, a storing device for storing a plurality of recording mediums, and movers for relatively moving the reproducing device and the storing device, the reproducing apparatus comprising:

a first mode for sequentially detecting discs stored in the storing device;

a second mode in which the movers position the reproducing device and the storing device at a predetermined initializing position for transport of the reproducing apparatus, wherein said initializing position is a waiting position where the reproducing device and the storing device are mechanically most stable;

an instructor for instructing a command; and a controller responsive to the command during the first mode for stopping the operation of the first mode and for operating the second mode.

3. The system according to claim 2 wherein the first mode is a mode for performing an initialization process after resetting by power on.

4. A reproducing apparatus according to claim 1, wherein the reproducing device comprises an optical pickup mechanism and a clamp mechanism.

5. A reproducing apparatus according to claim 2 wherein after an initializing process by the first mode is executed, normal operation for reproducing data on a recording medium is started.

6. A reproducing apparatus according to claim 1, wherein the storing device comprises a plurality of trays that are moved to the predetermined fixable initializing position.

7. The reproducing apparatus according to claim 1, wherein the reproducing device and the storing device are fixed at the predetermined fixable initializing position by at least one fixing bracket.

8. The reproducing apparatus according to claim 7, wherein the reproducing apparatus comprises a housing having a pair of oppositely disposed holes through an outer surface and the at least one fixing bracket is threadably inserted through each one of the holes to fix at least one of the reproducing device and the storing device within the housing.

* * * * *

UNITED STATES PATENT AND TRADEMARK OFFICE
CERTIFICATE OF CORRECTION

PATENT NO. : 6,252,832 B1
DATED : June 26, 2001
INVENTOR(S) : Furukawa et al.

It is certified that error appears in the above-identified patent and that said Letters Patent is hereby corrected as shown below:

<u>Title page,</u>
Item [22], change "Nov. 1, 1999" to -- Nov. 4, 1999 --.

Signed and Sealed this

Eighteenth Day of June, 2002

*Attest:*

*Attesting Officer*

JAMES E. ROGAN
*Director of the United States Patent and Trademark Office*